(12) United States Patent
Budweil

(10) Patent No.: US 11,117,434 B2
(45) Date of Patent: Sep. 14, 2021

(54) VEHICLE SUSPENSION SYSTEM

(71) Applicant: TRIGGO S.A., Lomianki (PL)

(72) Inventor: Rafal Budweil, Cracow (PL)

(73) Assignee: TRIGGO S.A., Lomianki (PL)

( * ) Notice: Subject to any disclaimer, the term of this patent is extended or adjusted under 35 U.S.C. 154(b) by 0 days.

(21) Appl. No.: 16/508,344

(22) Filed: Jul. 11, 2019

(65) Prior Publication Data

US 2019/0329621 A1    Oct. 31, 2019

Related U.S. Application Data

(63) Continuation of application No. PCT/EP2018/050303, filed on Jan. 8, 2018.

(30) Foreign Application Priority Data

Jan. 13, 2017   (EP) .................................... 17461502

(51) Int. Cl.
  *B60G 17/00*    (2006.01)
  *B60G 3/20*     (2006.01)
  *B60G 7/00*     (2006.01)
  *B62D 7/18*     (2006.01)

(52) U.S. Cl.
  CPC ............... *B60G 17/00* (2013.01); *B60G 3/20* (2013.01); *B60G 7/001* (2013.01); *B62D 7/18* (2013.01); *B60G 2200/18* (2013.01); *B60G 2500/40* (2013.01)

(58) Field of Classification Search
  CPC .......... B60G 17/00; B60G 3/20; B60G 7/001; B60G 2200/18; B60G 2500/40; B60G 2200/144; B62D 7/18
  See application file for complete search history.

(56) References Cited

U.S. PATENT DOCUMENTS

| | | | | |
|---|---|---|---|---|
| 3,306,390 A | * | 2/1967 | Jamme | B60B 35/001 180/209 |
| 3,899,037 A | * | 8/1975 | Yuker | B60G 17/01925 180/6.48 |
| 4,498,554 A | * | 2/1985 | Young | B62D 7/1509 180/236 |
| 4,842,295 A | * | 6/1989 | Hawkins | B60G 7/006 280/5.522 |

(Continued)

FOREIGN PATENT DOCUMENTS

| | | |
|---|---|---|
| DE | 907838 | 3/1954 |
| EP | 2388153 | 11/2011 |
| WO | 2005/056308 | 6/2005 |

*Primary Examiner* — Paul N Dickson
*Assistant Examiner* — Timothy Wilhelm
(74) *Attorney, Agent, or Firm* — Mark M. Friedman

(57) ABSTRACT

A suspension system for a vehicle. The suspension system has a steering knuckle connected through suspension means with a vehicle chassis portion, guiding means and driving means. The guiding means enable movement of the steering knuckle with respect to the vehicle chassis portion along an arched pathway between a first and a second position. The driving means effect the movement of the steering knuckle between the first and the second position. The guiding means effect a selected angular orientation of the steering knuckle with respect to the vehicle chassis portion during the movement between the first position and the second position.

13 Claims, 10 Drawing Sheets

(56) References Cited

U.S. PATENT DOCUMENTS

| | | | |
|---|---|---|---|
| 5,700,025 A * | 12/1997 | Lee | B60G 3/265 |
| | | | 280/124.135 |
| 6,311,795 B1 * | 11/2001 | Skotnikov | B60G 17/0152 |
| | | | 180/252 |
| 7,401,794 B2 * | 7/2008 | Laurent | B60G 3/01 |
| | | | 280/124.134 |
| 7,717,210 B2 * | 5/2010 | Mahy | A61G 5/046 |
| | | | 180/209 |
| 7,878,511 B2 * | 2/2011 | Haeusler | B60G 3/18 |
| | | | 280/124.136 |
| 7,914,020 B2 * | 3/2011 | Boston | B60G 3/20 |
| | | | 280/124.136 |
| 7,914,025 B2 * | 3/2011 | Mayen | B60G 3/20 |
| | | | 280/124.109 |
| 8,517,135 B2 * | 8/2013 | Schapf | B60G 3/20 |
| | | | 180/233 |
| 8,801,015 B2 * | 8/2014 | Inui | B60G 13/08 |
| | | | 280/124.157 |
| 8,813,864 B2 * | 8/2014 | Layton | E02F 3/84 |
| | | | 172/311 |
| 9,162,706 B2 * | 10/2015 | Praia | B60G 17/016 |
| 9,346,497 B2 * | 5/2016 | Dames | B62D 49/0678 |
| 10,518,600 B2 * | 12/2019 | Reybrouck | B60G 7/003 |
| 10,562,364 B2 * | 2/2020 | Crook | B60G 3/02 |
| 10,645,874 B2 * | 5/2020 | Krajewski | A01D 67/00 |
| 2005/0161272 A1 * | 7/2005 | Bordini | B60G 3/24 |
| | | | 180/252 |
| 2019/0275834 A1 * | 9/2019 | Budweil | B62D 61/065 |

\* cited by examiner

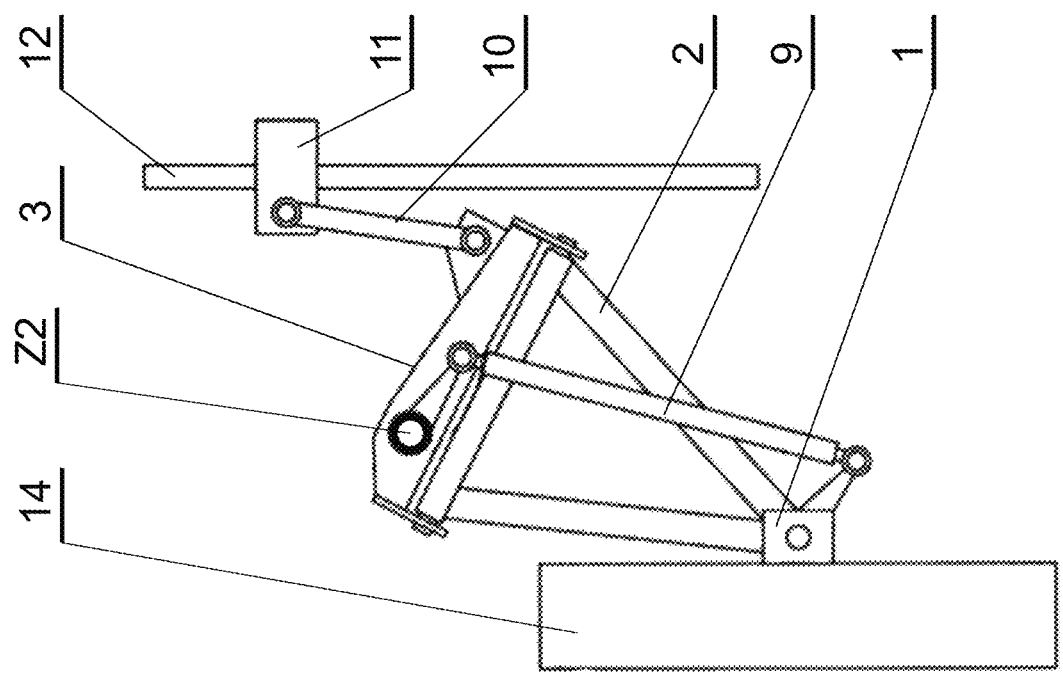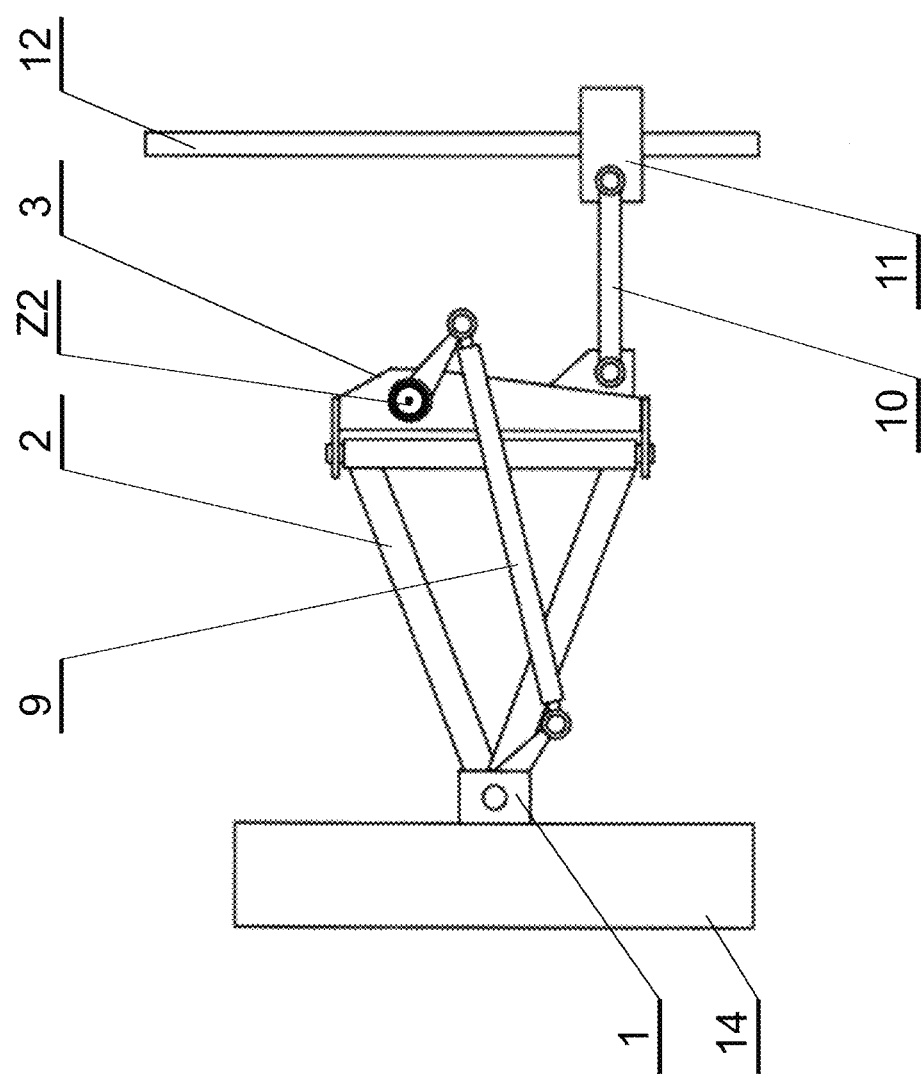
Fig. 6a
Fig. 6b

VEHICLE SUSPENSION SYSTEM

TECHNICAL FIELD

The invention relates to vehicles with variable track.

BACKGROUND

Variable track axles are used to enhance the functionality of vehicles, by facilitating the use of vehicles in different environments, adjustment of vehicle aerodynamics at different speeds or adjustment of vehicle stability at different driving conditions.

The disadvantage of these vehicles is that a change in track width is effected using dedicated, costly hydraulic or electrical means. This results in higher mass of the vehicle, higher manufacturing costs and higher complexity.

SUMMARY OF THE INVENTION

Certain embodiments of the invention provide an alternative suspension system for a vehicle with variable track width, which allows for easy and secure track-width change, utilizing cost effective means. In particular, the invention provides a suspension that allows the wheel to maintain a selected orientation with respect to the vehicle chassis during changing of the track width. The invention further provides a suspension that allows adjustment of toe angle while the suspension transitions from between the retracted and extended configuration. The invention also provides means for counter-acting changes of effective wheel suspension load resulting from the changes in load distribution, which in turn is caused by wheelbase dimension changes between the retracted and extended configuration.

The suspension system for a vehicle comprises a steering knuckle connected through suspension means with a vehicle chassis portion, guiding means configured to enable movement of the steering knuckle with respect to the vehicle chassis portion along an arched pathway between a first and a second position, driving means configured to effect the movement of the steering knuckle between the first and the second position. The guiding means comprise: at least one control arm connected with its first end rotatably to the steering knuckle in a first connection point and mounted with its second end pivotably in a yoke, wherein the yoke is further rotatable about an axis Z2, and wherein the first connection point is located on an axis Z1 parallel to vertical vehicle axis Z; a rigid arm connected rotatably to the steering knuckle in a second connection point and connected rotatably to the vehicle chassis portion in a third connection point, wherein the second connection point is distanced from the axis Z1 by a distance A, and the third connection point is distanced from the axis Z2 by a distance B, and wherein the distances A and B are selected as to effect a selected angular orientation of the steering knuckle with respect to the vehicle chassis portion during the movement between the first position and the second position, stability compensating means, configured to compensate a change in vehicle stability between the first and the second position of the steering knuckle, wherein the stability compensating means comprise a shock absorber comprising a first end portion coupled with the steering knuckle and a second end portion connected with the vehicle chassis portion in fourth connection point, wherein the second end portion is displaced with respect to the first end portion along the longitudinal vehicle axis X, and wherein the position of the connection point is movable with respect to the vehicle chassis portion in a controlled manner to compensate changes of length of the shock absorber related to the change of the steering knuckle position between the first and the second position.

In some embodiments, the driving means comprises a driving assembly, adapted to rotate bi-directionally at least one of the elements of the guiding means about the axis Z2.

In some embodiments, the driving assembly comprises a nut and screw assembly.

In some embodiments, the driving assembly is be lever-actuated.

In some embodiments, the distances A and B is constant.

In some embodiments, the connection point is movable parallel to the vertical vehicle axis Z.

In some embodiments, the axis Z2 is parallel to vertical vehicle axis Z.

In some embodiments, the connection point is movable with respect to the vehicle chassis portion in a controlled manner.

In some embodiments, the connection point is movable parallel to the longitudinal vehicle axis X or lateral axis Y or vertical axis Z.

BRIEF DESCRIPTION OF DRAWINGS

Further details and features of the present invention, its, their nature and various advantages will become more apparent from the following detailed description of the preferred embodiments shown in a drawing, in which:

FIG. 6a shows a wide configuration of the suspension;

FIG. 6b shows a narrow configuration of the suspension;

DETAILED DESCRIPTION OF THE INVENTION

The suspension system as described above can be used in a vehicle with variable track width, such as those presented in patents EP2388153 or EP2388179. When the vehicle is to be driven, the front wheels may be set to the wide track and the vehicle can be controlled via the steering means configured to control the turn of the front wheels and/or of the rear wheel. Such "driving mode" provides good stability for the vehicle. This position of the wheels (and thus of their steering knuckles) with respect to the vehicle chassis can be denoted as a first position. When the vehicle is to be parked at a narrow space, the front wheels may be set to the narrow track and the vehicle can be controlled via the steering means configured to control the turn of the rear wheel. Such "parking mode" provides narrow dimensions of the vehicle and good maneuvering capabilities. Therefore, the vehicle can be easily parked in narrow parking spaces. This position of the wheels (and thus of their steering knuckles) with respect to the vehicle chassis can be denoted as a second position. When the wheel base shortens for a narrower front track width, the turning radius decreases and the maneuvering capabilities are further increased.

Figure 1:
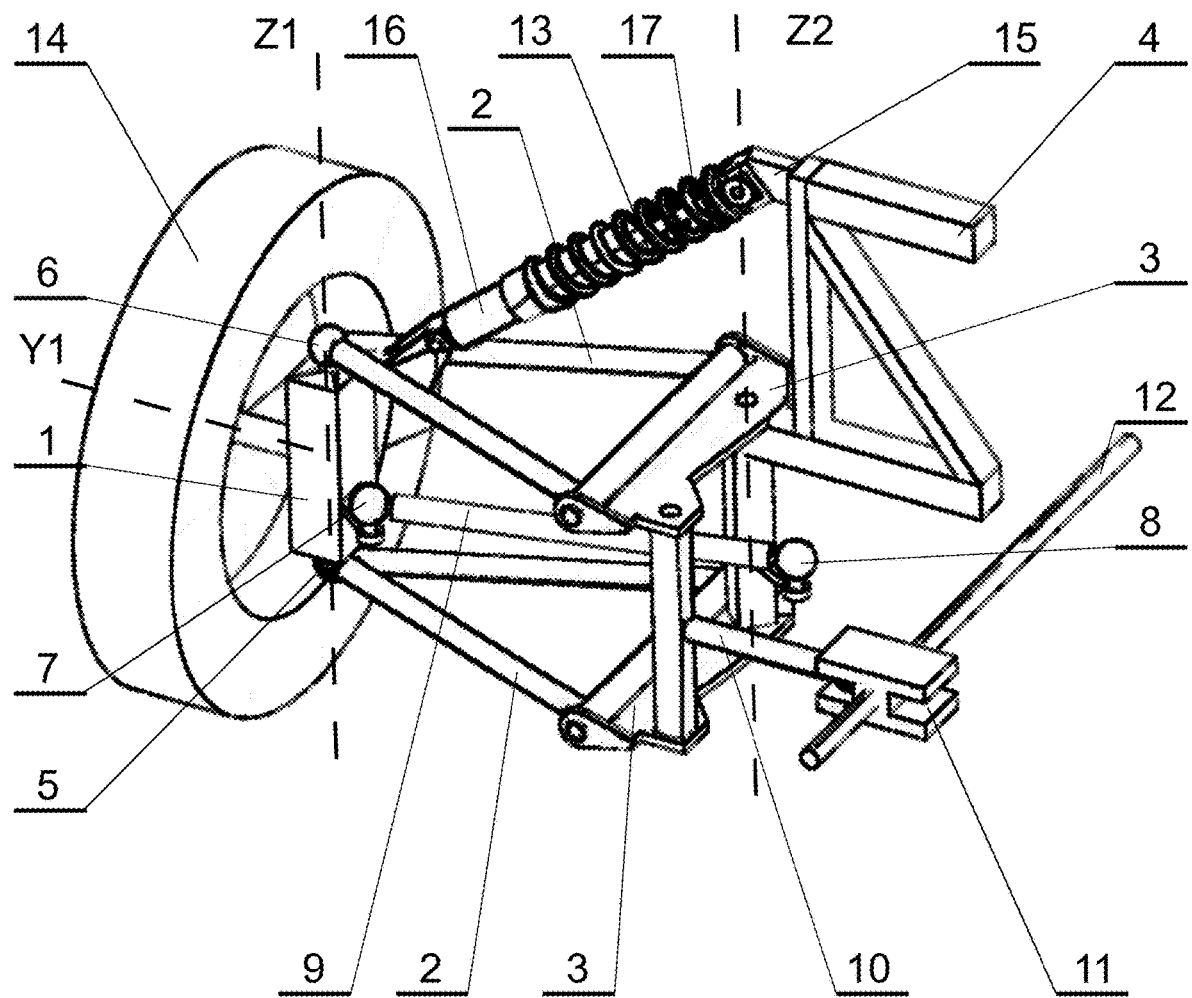
FIG. 1 shows a vehicle suspension system according to a first embodiment in an isometric view.

Throughout the description the general vehicle directions are used, namely a longitudinal vehicle direction X, a lateral vehicle direction Y and a vertical vehicle direction Z, in a manner common in the art. These directions are represented as a coordinate system as indicated in FIG. 1, and serve to describe various features of the invention. These directions represent the directions of the vehicle in which the suspensions system is intended to be installed. Therefore, said suspension system is designed to be installed in a specific orientation with respect to the vehicle chassis.

A suspension system for a vehicle according to the invention comprises a steering knuckle 1 connected through suspension means with a vehicle chassis portion 4. The steering knuckle 1 serves as an intermediary element between the rest of the suspension system and a wheel 14. Any movement of the steering knuckle 1 results in analogous movement of the wheel 14. The suspension system further comprises guiding means configured to enable movement of the steering knuckle 1 with respect to the vehicle chassis portion 4 along an arched pathway between the first and the second position. The suspension system further comprises driving means configured to effect the movement of the steering knuckle 1 between the first and the second position. The guiding means are adapted to effect a selected angular orientation of the steering knuckle 1 with respect to the vehicle chassis portion 4 during the movement between the first position and the second position. Preferably, the suspension system further comprises stability compensating means, configured to compensate a change in vehicle stability between the first and the second position of the steering knuckle.

FIG. 1 shows a vehicle suspension system according to first embodiment in an isometric view. The guiding means comprise a control arm 2 cooperating with a rigid arm 9. More specifically, the vehicle suspension system comprises a steering knuckle 1 connected with a vehicle chassis portion 4 via at least one control arm 2 mounted pivotally in a yoke 3. The vehicle chassis portion 4 is an arbitrary fragment of the vehicle chassis, serving as a mounting point for the suspension system. Preferably, it is a rigid part of the chassis e.g. a vehicle frame. The steering knuckle 1 is connected in a first connection point 5 with the control arm 2 by a first ball joint. The yoke 3 serves as an intermediary member between the control arm 2 and the vehicle chassis portion 4. Preferably, as it is shown in the first embodiment, the suspension system comprises two control arms 2 connecting the steering knuckle 1 with the vehicle chassis via respective yokes 3 and operating in parallel. The yoke 3 allows the control arm 2 to pivot with respect to the vehicle chassis portion 4 in a manner known in the art. The yoke 3 is also mounted rotatably with respect to the vehicle chassis 4, so that the yoke 3 (and consequently also the control arm 2) can rotate with respect to the vehicle chassis portion 4 around axis Z2. In other words, the control arm 2 has two degrees of freedom with respect to the vehicle chassis portion 4. The steering knuckle 1 is further connected with the vehicle chassis portion 4 via a rigid member 9. Vertical position of a steering knuckle 1 is controlled via a shock absorber 13. The shock absorber 13 comprises a first end portion 16 coupled with the steering knuckle 1 and a second end portion 17 connected with the vehicle chassis portion 4 in fourth connection point 15. Location of the connection point 15 with respect to the vehicle chassis portion 4 influences the vertical position of the wheel 14, or load drawn on a spring element of the shock absorber 13. The position of the connection point 15 may be constant and displaced versus axis Z2 in the same direction as the wheel 14 is being displaced along the longitudinal axis X of the vehicle during the retraction movement of the suspension. In such case, during the retraction movement of the suspension, the distance between the connection point 15 and connection point 5 decreases. This compensates for decrease in length of the shock absorber due to change in weight distribution caused by related change in the wheelbase and thus enables to maintain the vertical position of the chassis of the vehicle during and after retraction.

Figure 4:
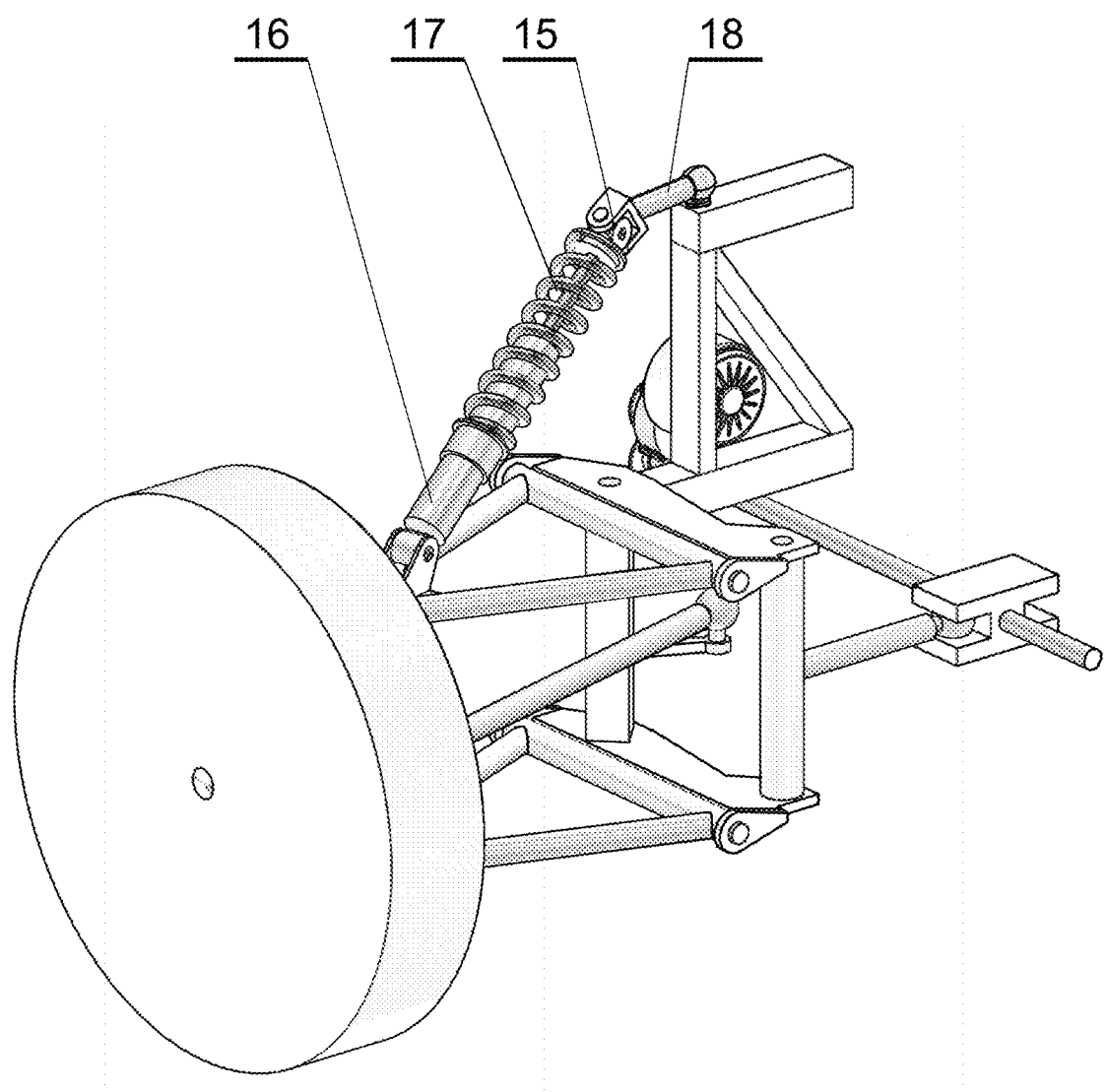
FIG. 4 shows a modified example of the first embodiment.

In some embodiments both vertical and horizontal position of the connection point 15 may be moveable and controlled by dedicated control means in order to achieve proper positioning of the steering knuckle 1 and a wheel 14 versus chassis of the vehicle, and/or to control the load drawn on the spring element of the shock absorber 13. Such vertical and/or horizontal position control can be achieved for example via appropriate control means acting on a pivotable arm 18, as shown in FIG. 4 in relation to the first embodiment, and in relation to further embodiments.

Figure 2:
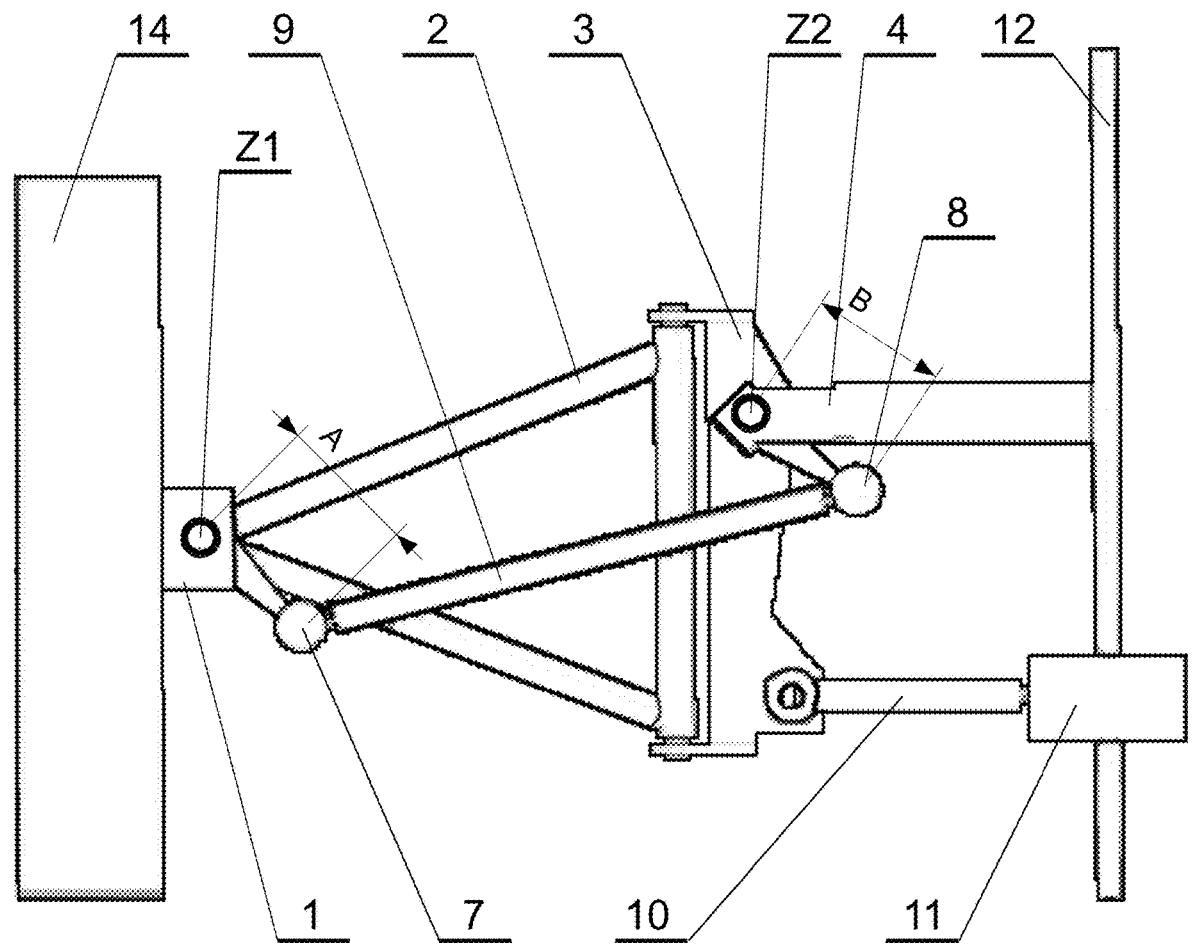
FIG. 2 shows the vehicle suspension system according to the first embodiment in a top view.
Figure 3:
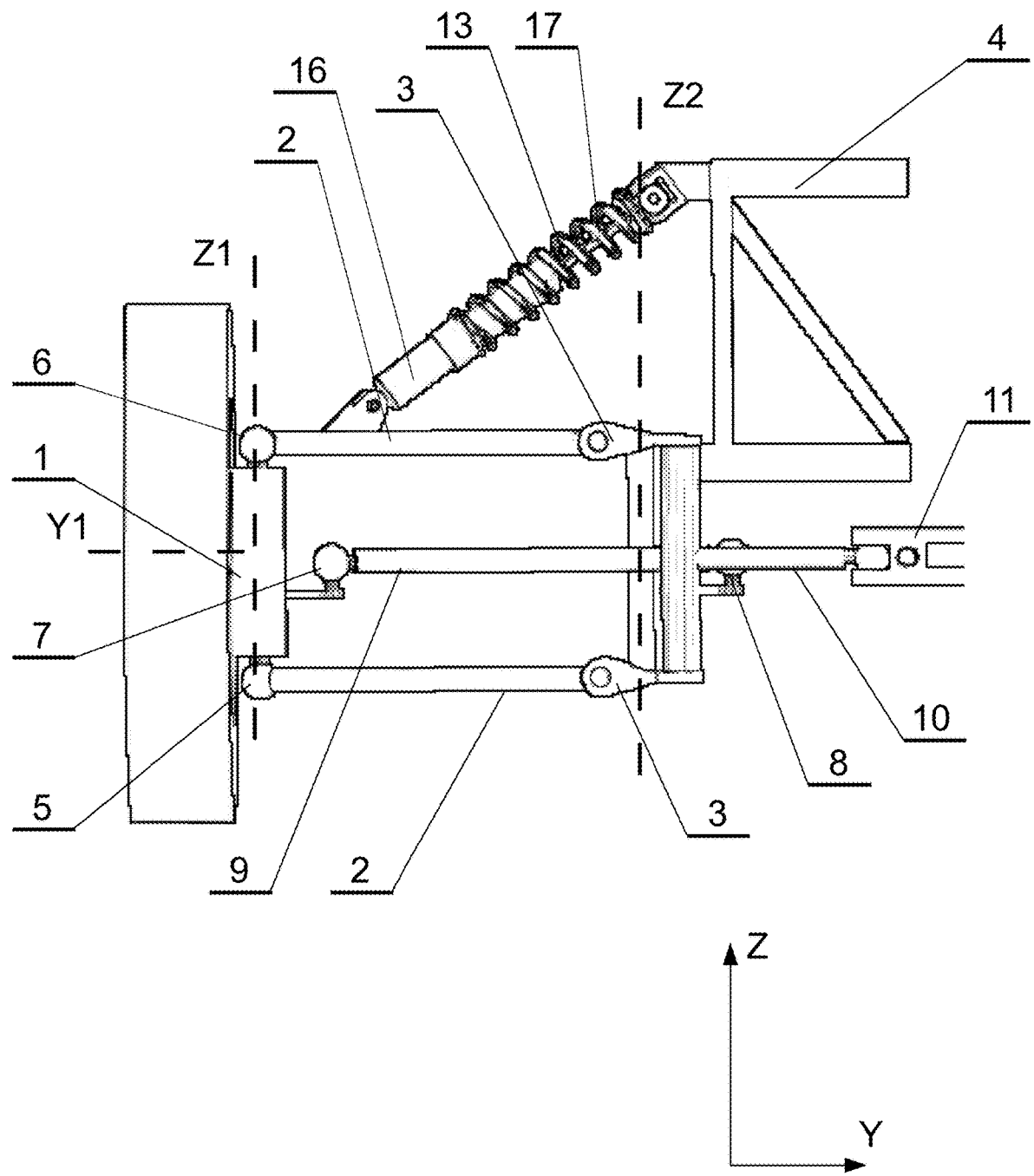
FIG. 3 shows the vehicle suspension system according to the first embodiment in a side view.

FIG. 2 shows a vehicle suspension system according to the first embodiment in a top view, while FIG. 3 shows the vehicle suspension system according to the first embodiment in a side view. The steering knuckle 1 is connected in a second connection point 7 by a second ball joint with the rigid member 9. The steering knuckle 1 is enabled to rotate around an axis Z1. Preferably, the axis Z1 is parallel to vertical vehicle axis. The second connection point 7 and the axis Z1 are distanced from each other by a distance A.

The rigid member 9 is connected to the vehicle chassis portion 4 through a third connection point 8 via the third ball joint. The third connection point 8 may be positioned versus rotation axis Z1 in a controlled manner, such that its location defines the angular position of the steering knuckle 1 with respect to the vehicle chassis as the yoke 3 with the control arm 2 rotate around axis Z1. Consequently, the angular orientation of a wheel 14 attached to the steering knuckle 1 with respect to the vehicle chassis can be controlled during track width change.

Specifically, the position of the connection point 8 may be constant and the distance B between connection point 8 and the rotation axis Z2 may be equal to the distance A between the connection point 7 and the axis Z1. In such embodiment the angular orientation of a wheel 14 will remain constant independently of the rotation of a yoke 3 around axis Z2.

In other embodiments, the distances A and B, as well as position of the connection points 7 and 8 may be adjusted in a variety of different fashions in order to achieve desired dependencies between the angular orientation of a wheel 14 and the angular orientation of a yoke 3 rotating around axis Z2. In particular, the connection point 8 can be movable parallel to the longitudinal vehicle axis X and/or lateral axis Y and/or vertical axis Z in order to assure the desired toe angle of the wheel 14 around rotation axis Z1 for any given angular orientation of the yoke 3, so that the lateral reaction force of the wheel rotating around its main horizontal axis Y1, as the vehicle moves, supports the rotation of the yoke around axis Z2. In other words, the movable connection points 7 and/or 8 further aid both moving the steering knuckle 1 between the first and the second position, and effecting a selected angular orientation of the steering knuckle 1 with respect to the vehicle chassis portion 4 during the movement between the first position and the second position.

Any ball joint referenced in this application is to be understood as any joint that allows for movement in two planes/rotation about two axes, preferably a spherical joint. A helm joint (rose joint) can also be used.

Figure 5:
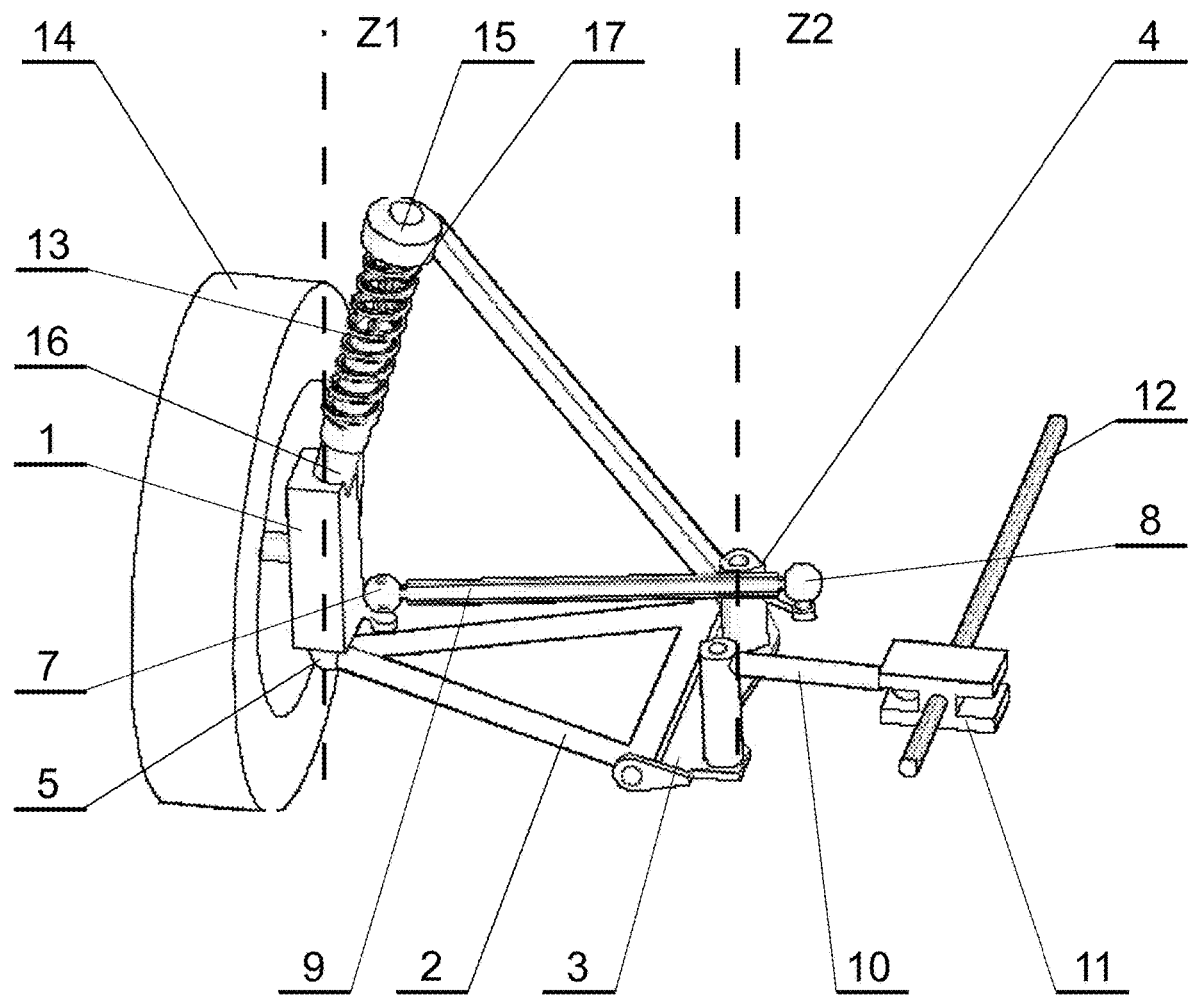
FIG. 5 shows a vehicle suspension system according to a second embodiment in an isometric view.
Figure 10:
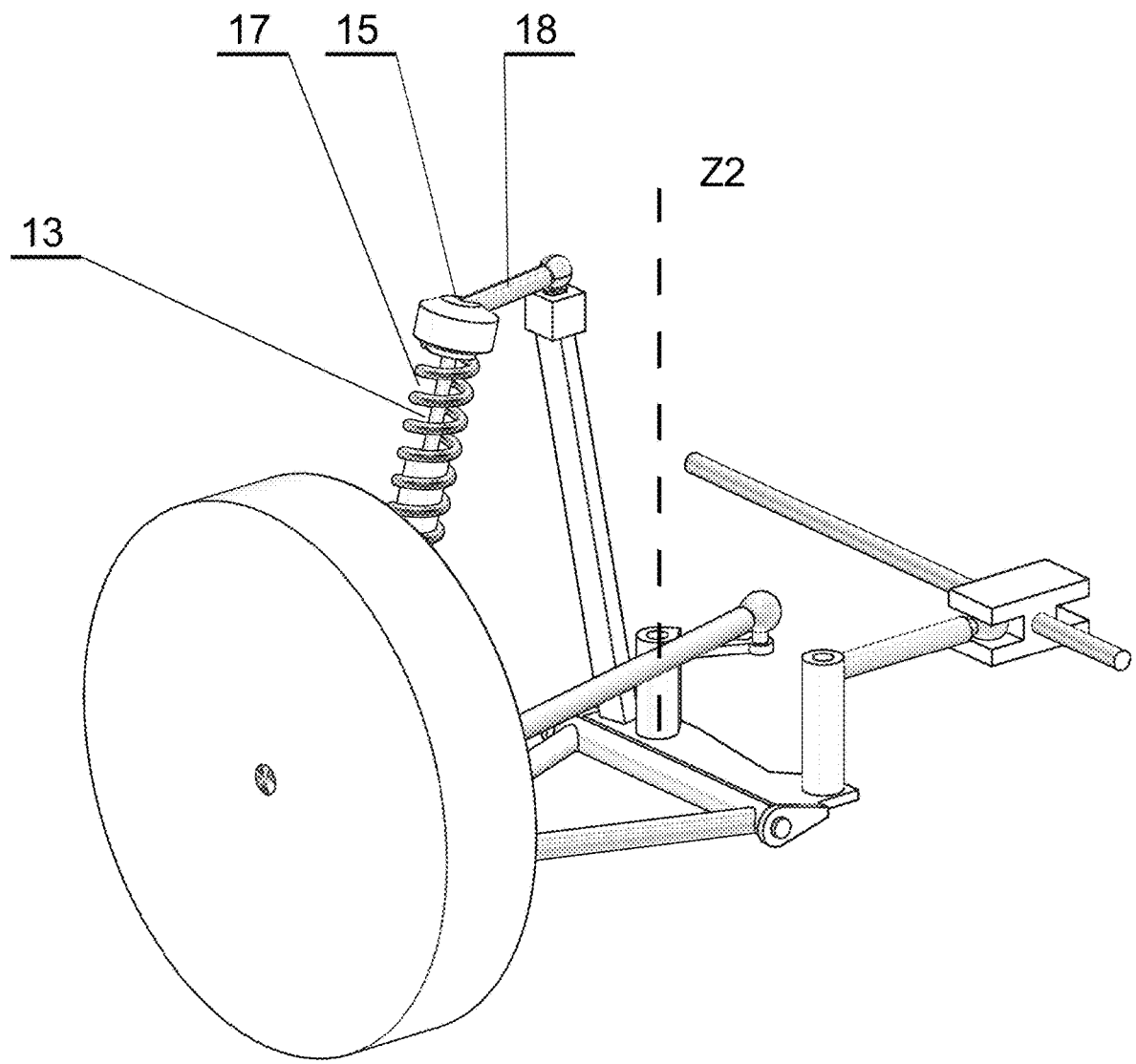
FIG. 10 shows a modified suspension system of FIG. 5.

FIG. 5 shows a vehicle suspension system according to the second embodiment in an isometric view. In this example, there is only one control arm 2 and one yoke 3, and the suspension is carried out in form of a MacPherson strut. The rest of the elements however is analogous to the first embodiment and operates accordingly. In this example, the second end portion 17 is connected with the vehicle chassis portion 4 via yoke 3. It can be connected directly to the yoke 3, or via arm 18, as shown in FIG. 10.

FIGS. 6a, 6b show comparison between the wide configuration (the first position of the steering knuckle) and the narrow configuration (the second position of the steering knuckle) of the suspension. Preferably, the driving means comprise a driving assembly, adapted to rotate bi-directionally at least one of the elements of the guiding means about the axis Z2. In this embodiment, this is a nut unit 11 traveling along a screw 12. Preferably, either the screw 12 or the nut unit 11 is driven by an electric motor. This driving assembly pulls or pushes a connecting member 10, pivotably mounted in the yoke 3, which effects rotation of the yoke 3 around the axis Z2, and consequently the change between the first and the second positions.

The change between the wide configuration and the narrow configuration can also be performed using electric drives which directly drive the wheels 14.

Figure 7:
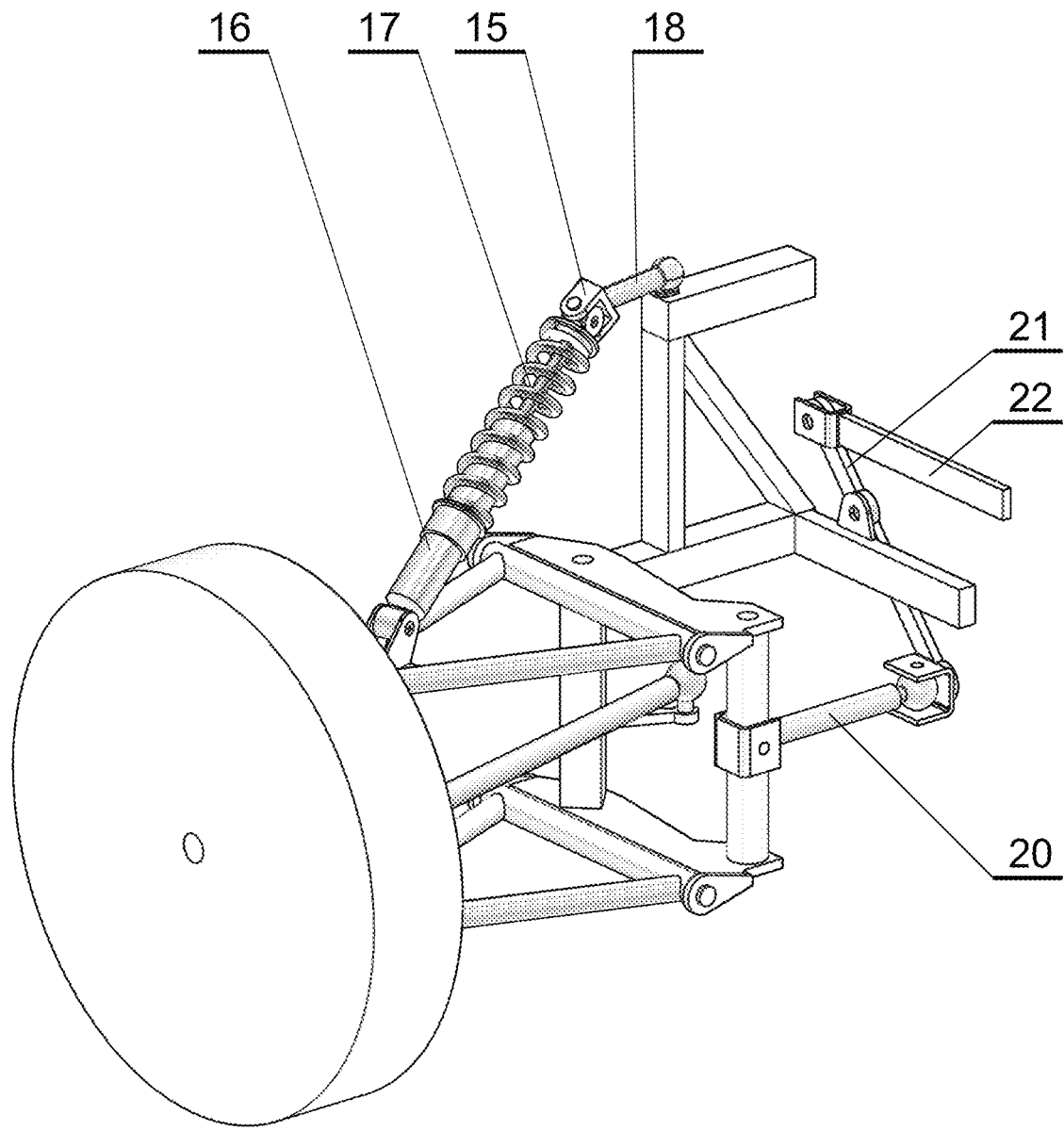
FIG. 7 shows an example of driving means.
Figure 8:
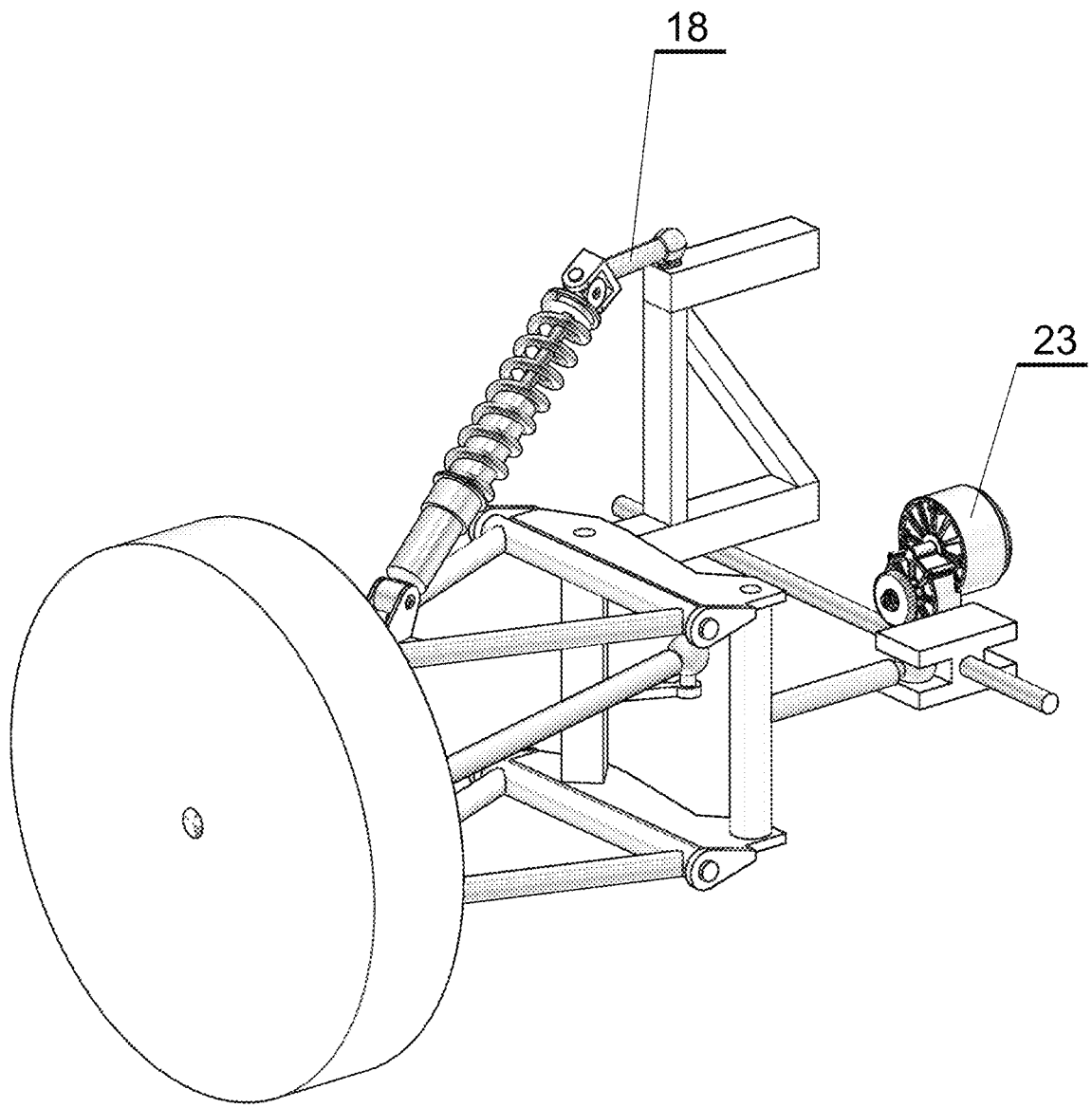
FIG. 8 shows an example of driving means.

FIGS. 7 and 8 show further examples of driving means.

In FIG. 7, the driving assembly is lever-actuated. Element 20 which connects two symmetrically arranged connectors is displaced to the front or rear of the vehicle due to the rotation of the oblique lever 21, which is attached to element 20 by its first end. The oblique lever 21 rotates around a fixed axis of rotation. Rotation of the lever 21 is effected by a movement of bar 22 mounted at the second end of the lever 21.

In FIG. 8, the driving assembly comprises a nut and screw assembly, which is actuated by an electric motor 23 attached directly to the moving element.

Figure 9:
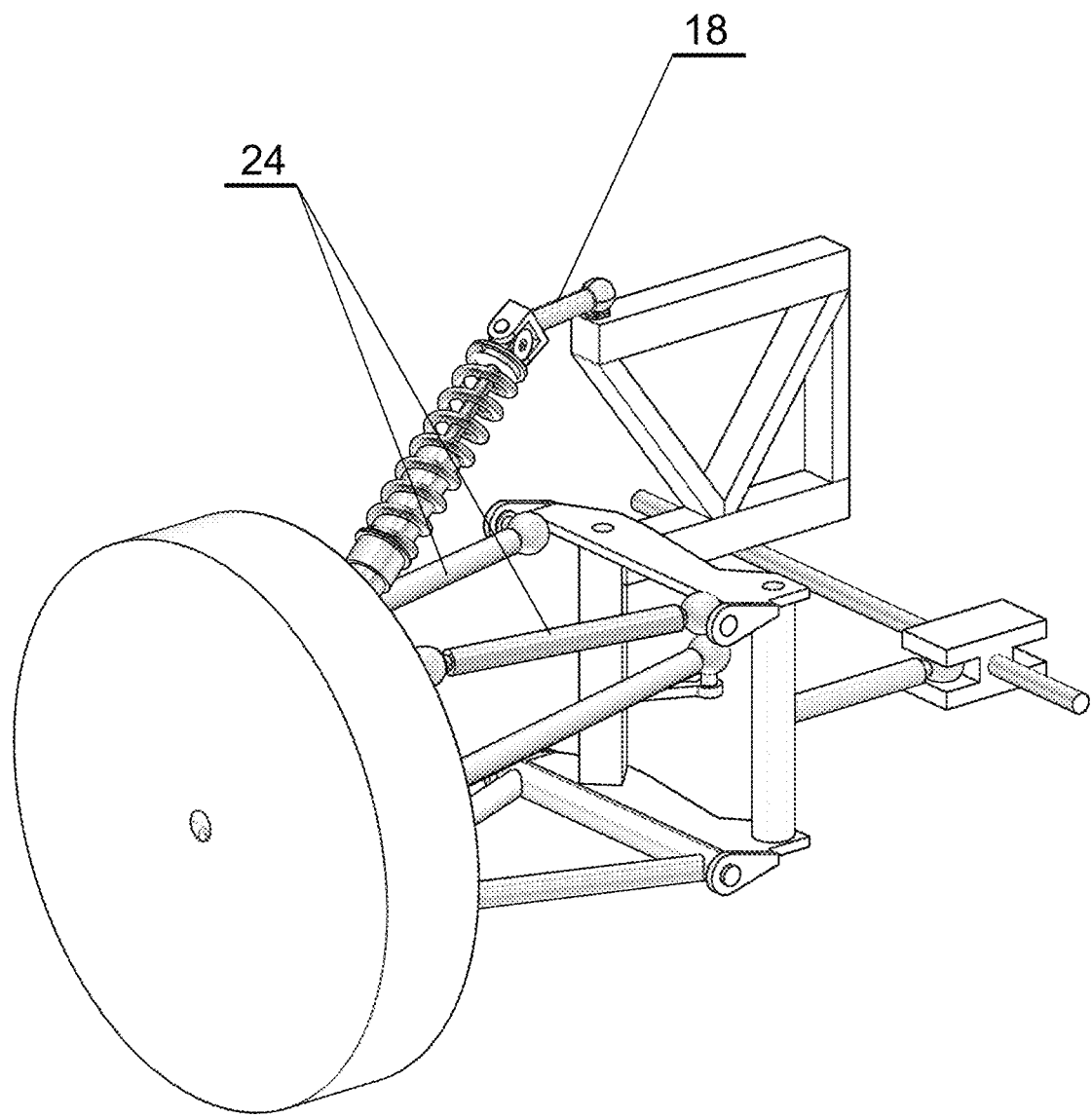
FIG. 9 shows a vehicle suspension system according to a third embodiment in an isometric view.

FIG. 9 shows a vehicle suspension system according to the third embodiment in an isometric view. In this embodiment, the suspension utilizes one control arm 2 (a wishbone) and rods 24 located substantially parallel with respect to the wishbone. Such multi-link suspension is light weight and easier to manufacture. It allows to obtain an independent scrub radius of a desired value and a significant pitch compensation during braking and accelerating. Forces originating from wheels may be transferred to the body, while maintaining a large distance between the fixing points. It is also possible to obtain a preferred toe angle and camber angle, depending on deflection of the suspension.

It should be borne in mind that any of the embodiments shown in FIGS. 7-9 can be also carried out without the moving arm 18 and the movable connection point 15, i.e. analogously to the first embodiment, with a fixed connection point 15.

What is claimed is:

1. A suspension system for a vehicle, the suspension system comprising:
   a steering knuckle connected through suspension means with a vehicle chassis portion;
   guiding means configured to enable movement of the steering knuckle with respect to the vehicle chassis portion along an arched pathway between a first and a second position;
   driving means configured to effect the movement of the steering knuckle between the first and the second position;
   wherein the guiding means comprise:
      at least one control arm connected with its first end rotatably to the steering knuckle in a first connection point and mounted with its second end pivotably in a yoke, wherein the yoke is further rotatable about an axis Z2, and wherein the first connection point is located on an axis Z1 parallel to vertical vehicle axis Z;
      and a rigid fixed-length arm connected rotatably to the steering knuckle in a second connection point and connected rotatably to the vehicle chassis portion in a third connection point, wherein the second connection point is distanced from the axis Z1 by a fixed distance A, and the third connection point is distanced from the axis Z2 by a fixed distance B, and wherein the fixed distances A and B are selected as to effect a selected angular orientation of the steering knuckle with respect to the vehicle chassis portion during the movement between the first position and the second position and wherein the fixed distances A and B do not change during the movement between the first position and the second position;
   and stability compensating means, configured to compensate a change in vehicle stability between the first and the second position of the steering knuckle, wherein the stability compensating means comprise a shock absorber comprising a first end portion coupled with the steering knuckle and a second end portion connected with the vehicle chassis portion in a fourth connection point, wherein the second end portion is displaced with respect to the first end portion along the longitudinal vehicle axis X, and wherein the position of the fourth connection point is movable with respect to the vehicle chassis portion in a direction parallel to the vertical vehicle axis Z in a controlled manner to compensate changes of length of the shock absorber related to the change of the steering knuckle position between the first and the second position.

2. The vehicle suspension system according to claim 1, wherein the driving means comprise a driving assembly, adapted to rotate bi-directionally at least one of the elements of the guiding means about the axis Z2.

3. The vehicle suspension system according to claim 2, wherein the driving assembly comprises a nut and screw assembly.

4. A vehicle suspension system according to claim 3, wherein the third connection point is movable with respect to the vehicle chassis portion in a controlled manner.

5. The vehicle suspension system according to claim 2, wherein the driving assembly is lever-actuated.

6. A vehicle suspension system according to claim 5, wherein the third connection point is movable with respect to the vehicle chassis portion in a controlled manner.

7. A vehicle suspension system according to claim 2, wherein the third connection point is movable with respect to the vehicle chassis portion in a controlled manner.

8. The vehicle suspension system according to claim 1, wherein the distances A and B are constant.

9. A vehicle suspension system according to claim 8, wherein the third connection point is movable with respect to the vehicle chassis portion in a controlled manner.

10. The vehicle suspension system according to claim 1, wherein the axis Z2 is parallel to vertical vehicle axis Z.

11. A vehicle suspension system according to claim 10, wherein the third connection point is movable with respect to the vehicle chassis portion in a controlled manner.

12. The vehicle suspension system according to claim 1, wherein the third connection point is movable with respect to the vehicle chassis portion in a controlled manner.

13. The vehicle suspension system according to claim 12, wherein the third connection point is movable parallel to the longitudinal vehicle axis X or lateral axis Y or vertical axis Z.

* * * * *